3,169,080
COLLAPSIBLE UPRIGHT PASTING SURFACE
Charles Le Roy Hansen, 303 Edith Ave.,
Salt Lake City, Utah
Filed Jan. 7, 1963, Ser. No. 249,773
18 Claims. (Cl. 118—42)

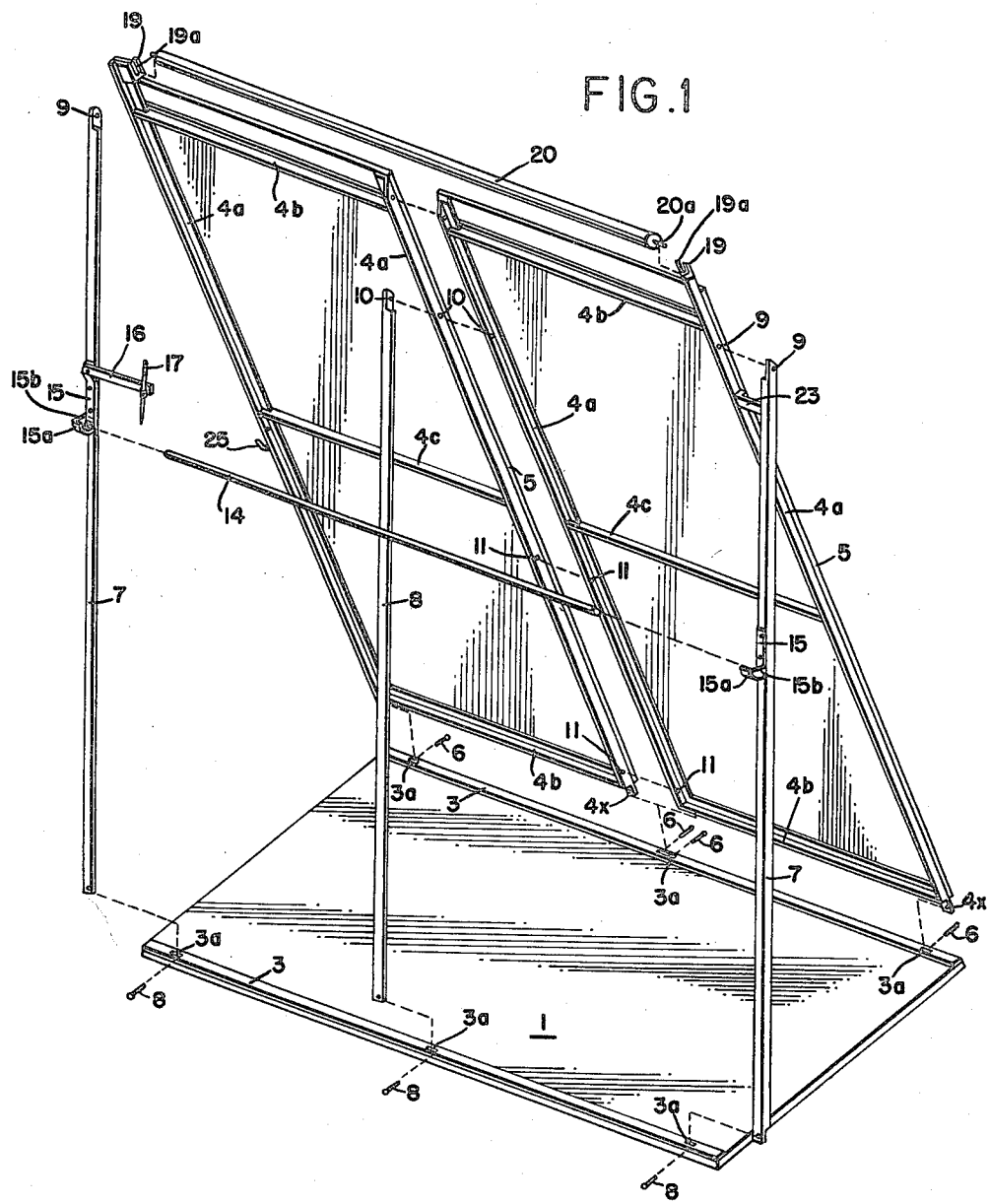

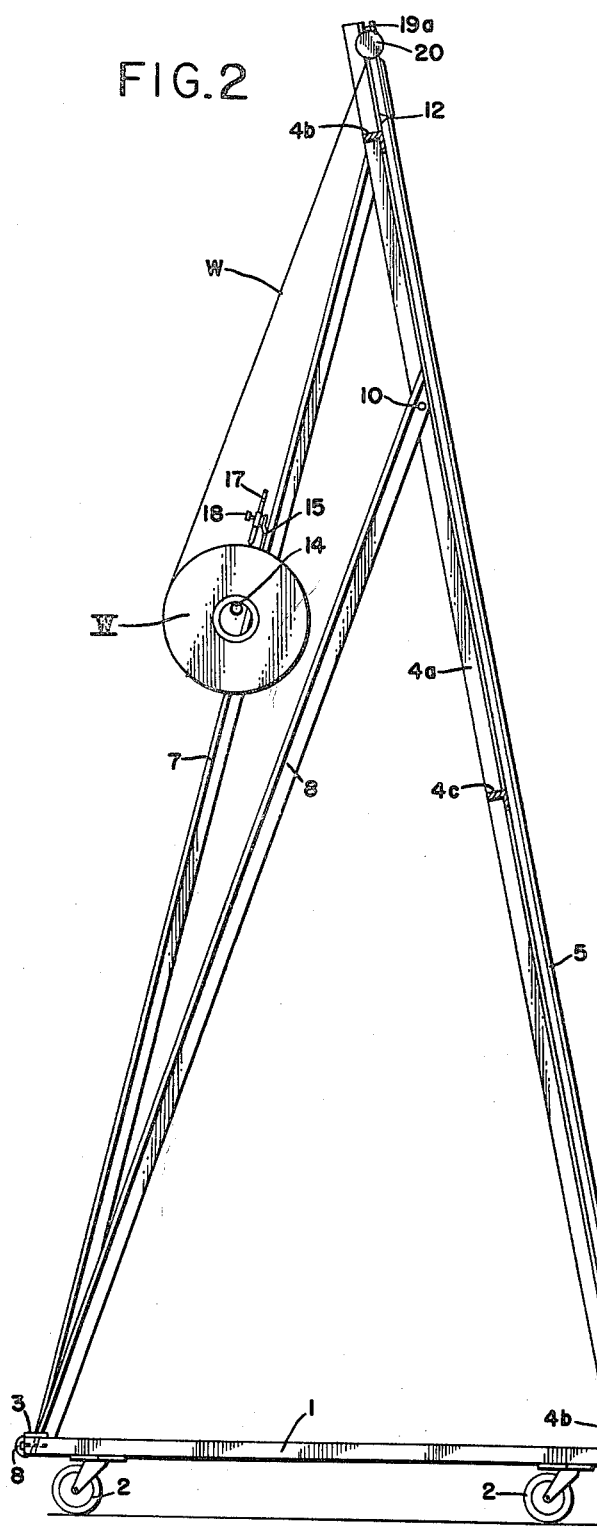
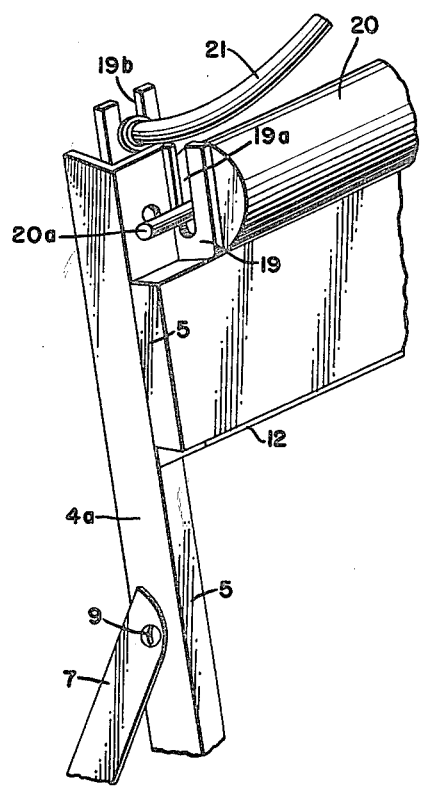

This invention is a novel collapsible upright pasting surface, use of which will facilitate the handling, measuring, cutting to length and width of material such as wall coverings and the like, and the application of adhesives thereto, and the principal object of my invention is to provide a pasting surface which possesses the particular advantages of mobility and ease of operation, and which embodies a novel combination of parts to achieve these advantages. While each particular element itself may not be new, the whole and general arrangement of my pasting surface is entirely new; also the concept of its application, and it will enormously improve and speed up production to suit any particular circumstances.

Further objects of the invention are to provide a collapsible upright pasting surface in which the roll of materal is hung on the back of device by means of a roller supported in brackets. The web of material is hung over the top and passed down the pasting surface, face side down, the web passing under a gravity roller which holds material securely against the top of the pasting surface while adhesive is being applied. Folding of the web on the pasting surface is done from bottom up after the web material has been pulled down to desired length on the pasting surface by using measuring-scale on either side thereof. Adjacent the top of the pasting surface is a horizontal cutting slot where a tool, such as a razor blade, may be used to cut the web material to desired length after adhesive has been applied thereto by use of a conventional painter's pressure-roller. The entire outer face of the pasting surface is covered with sheet aluminum to facilitate vertical cutting. This is done, after material has been pasted and folded up to necessary length, by measuring and marking from one edge of the material, then laying a straight-edge on the marks, and then cutting with a tool such as a razor blade. The entire apparatus is preferably set on rubber casters to expedite moving and general operation.

I will explain the invention with reference to the accompanying drawings, which illustrate one practical embodiment thereof to enable others familiar with the art to adopt and use the same, and will summarize in the claims the novel features of construction and novel combinations of parts, for which protection is desired.

In said drawings:

FIG. 1 is an exploded perspective view of my novel device showing the general framework of the pasting surface and indicating how the parts are joined together, the view being from the back.

FIG. 2 is an enlarged elevational side view of the device showing the parts in assembled relation, and showing a roll of material which is to be pasted supported upon the device.

FIG. 3 is an enlarged detail perspective elevation showing the top roller of the device and its means for mounting on the device; also the socket holder for the flexible electric light cable.

Figure 4:
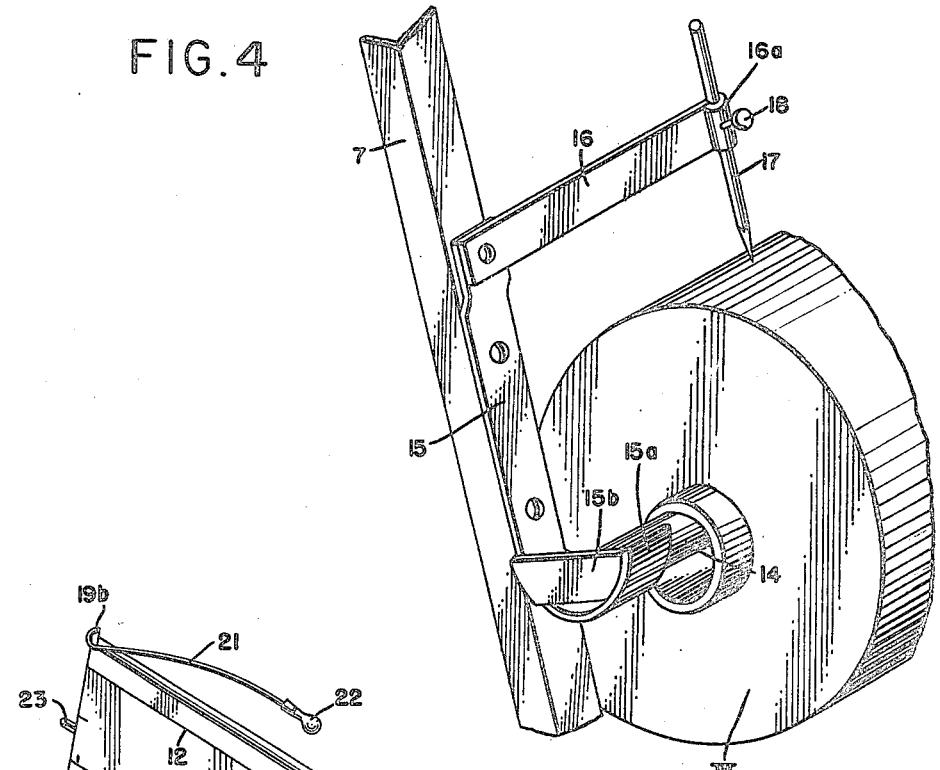
FIG. 4 is an enlarged perspective detail elevation showing the roll of material to be pasted mounted in the roll holding brackets; also showing the web marking pencil carried by one bracket.

As shown, my novel collapsible upright pasting surface consists of a rectangular base 1 of convenient size, supported upon casters 2 adjacent the respective corners thereof to impart mobility to the base. If desired, the periphery of the base may be covered by a rubber or other bumper (not shown). Disposed along the two longer edges of the base are metallic strips 3 respectively, as shown in FIG. 1, which are provided with holes or slots 3a at spaced intervals, the holes or slots 3a in one of which strips 3 being adapted to receive tongues on the pasting surface frames hereinafter described, which is disposed at an upwardly and inwardly inclined angle to the base, while the slots or holes 3a in the other strip 3 is adapted to receive tongues on the struts which support the pasting surface frames, as hereinafter described, so as to form a rigid but collapsible support for the pasting surface. The base 1 forms a convenient surface for receiving and storing thereon any hand tools, extra material, ladders, etc., which may be used in connection with the pasting surface.

As shown in FIG. 1, the pasting surface is formed of two rectangular frame sections, each section comprising a rectangular angle iron frame having vertical members 4a connected together by top and bottom members 4b, and having an intermediate cross member 4c, as shown in FIGS. 1 and 2, the members 4a, 4b and 4c being preferably welded or otherwise rigidly secured together. The two frame sections forming the pasting surface are preferably identical and are of combined width substantially equal to the length of the related strip 3 of the base 1 so that the two frame sections when placed together in abutting relationship, as shown in FIG. 5, will extend substantially the length of the base 1.

Figure 5:
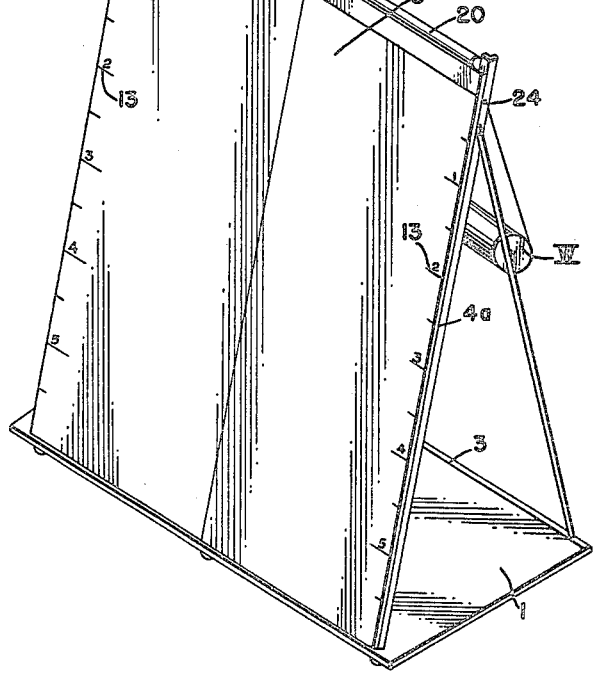
FIG. 5 is a reduced perspective front view of the device, showing the cutting slot and measuring-scale on the front face thereof.

The front of each frame section 4a–4c is covered by an aluminum sheet 5 which for rigidity is laminated to a plywood sheet, the laminated aluminum and plywood sheets being bolted to the outer or front face of their respective angle iron frames so as to form a unit therewith, and when the two pasting surfaces 5 of the frame sections 4a–4c are positioned on the base 1, as shown in FIG. 5, the adjacent edges of the same will abut.

The lower ends of the frame members 4a extend downwardly below the sheets 5 of the frame, as indicated at 4x, and are preferably perforated, the projecting portions 4x being adapted to enter the holes or slots 3a in the related strip 3 of the base, the projecting portions being locked therein by means of pins 6, FIG. 1, passing laterally through the strips 3 and the projecting portions 4x to removably lock the frames to the base 1.

When so assembled the inclined pasting surface frame sections are maintained in erected position by means of struts 7 disposed at the outer corners of the base 1, the lower ends of which are perforated and pass through the holes 3a in the adjacent strip 3 and are locked in position by means of pins 8 as shown in FIG. 1 applied in the same manner as the pins 6, hereinbefore referred to. The upper ends of the struts 7 are secured to the outer frame members 4a of the sections by means of screws or the like passing through registering holes 9 in the frame members 4a.

In order to support the central portion of the inclined pasting surface a central strut 8 is provided having its lower end passing through the central hole or slot 3a in the strip 3 and secured therein by nail 8, while the upper end thereof is perforated and is connected to the contacting inner vertical members 4a of the pasting surface by means of bolts or screws or the like passing through registering holes 10 in the member 7 and through the flanges of the inner abutting frame members 4a. Additional bolts or screws or the like may be passed through registering holes 11 adjacent the center and lower ends of the inner abutting frame members 4a, as indicated in FIG. 1.

Thus the inclined pasting surface may be secured upon the base 1 but by removal of the nails 6, 8 and other fastening members 9-10-11 the same may be readily knocked down or collapsed for convenience in transportation.

As shown more particularly in FIGS. 3 and 5, adjacent the upper end of the pasting surface 5 is a horizontal slot 12 which extends from side to side of surface 5 and is used for the purpose hereinafter described; and at each side of the pasting surface 5, as shown, is a scale 13 extending downwardly from slot 12 to denote the length of overlying web material on the pasting surface 5 which is to be cut off by running a razor blade or other tool along the slot 12 to sever a sheet from the roll W of web material being worked upon, as hereinafter described.

As shown, the roll W of wall paper or other material to be worked upon is losely hung on a rod 14 extending between the outermost struts 7 which support the pasting surface, the ends of rod 14 being receivable in journals mounted on the struts 7, and which comprise metallic straps 15, FIGS. 1 and 4, which are riveted to the struts 7 at the rear faces thereof and have their ends rolled upwardly as at 15a, the outer sides of the rolled journal portions 15a being closed by means of plates 15b to prevent the rod 14 from slipping axially out of the journals when placed therein with the roll W of the web carried thereby.

One of the straps 15 is provided at its upper end with a horizontally and pivotally disposed arm 16 (FIG. 4) extending inwardly over the web roll W and having at its outer end a socket 16a adapted to receive a pencil 17 or the like which may be locked therein by means of a thumb screw 18 or the like, so that the pencil will mark continuously upon the back of the roll W of web, as it is fed from the roll W up over the top of the pasting surface 5 as shown in FIG. 2, and down the outer face of said pasting surface with its back face outermost. As stated, the arm 16 is pivoted to the strap 15 and the pencil 17 draws a line on the backside of the material of the web W identifying one edge of the web from the other, which is very necessary for the purpose of matching in the installation of most wall covers.

At the top of the outer frame members 4a of the pasting surface, above the top of the aluminum sheets 5, are brackets 19, as shown more particularly in FIG. 3, which brackets have therein vertical slots 19a for the reception of the ends 20a of a steel tubular roller 20 which normally seats upon the top of the pasting surface 5, as shown in FIG. 3, so as to rest upon the web of material from the roll 4 which is passed upwardly from the rear of the pasting surface between the top of the pasting surface 5 and the roller 20 to hold the web from shifting on the pasting surface while it is being worked upon, such as during the application of paste to the portion of the web overlying the outer face of the pasting surface. The journals 20a of the roller 20 may obviously be lifted out of the journal slots 19a of a brackets 19 when another roll of web is to be put in place on the pasting surface.

Also, as shown in FIG. 3, one bracket 19 may support a socket 19b for an electric cable 21 carrying at its outer end an electric light bulb 22, which light and cable is removable when use is not desired.

As shown in FIG. 5, a bracket 23 may be provided on one side upright 4a of the pasting surface for holding a long cutting straight edge (not shown) when not in use. On the opposite side upright 4a, adjacent the upper end thereof, may be placed a magnet 24 or the like, for holding the cutting tool such as a razor blade, when not in use, to sever off a length of material from the web after being pasted and folded. As shown, the slot 12 for the razor blade across the pasting surface 5 is preferably tapered to keep the same open and clean of residue at all times. As shown in FIG. 1, a hook 25 may be provided on one side upright 4a for use in hanging the pressure pasting roller (not shown) when not in use.

I do not limit my invention to the exact form shown in the drawings, for obviously changes may be made therein within the scope of the claims.

I claim:

1. An upright pasting device, comprising a base; a pasting surface extending upwardly and inwardly of the base adjacent one side thereof; means for maintaining said pasting surface in said inclined position; means for removably and rotatably supporting a roll of material to be pasted in rear of the pasting surface and above said base whereby the web of said roll may be passed upwardly from the roll and over the top of the pasting surface and then down upon the front face of the pasting surface; a removable pressure roller gravitationally journaled at the top of the pasting surface and adapted to contact and to seat upon the upper edge of the pasting surface with the web of material interposed between the pressure roller and the pasting surface; said pasting surface having a horizontal web cutting slot therein adjacent and below the pressure roller; and measuring indicia disposed on and at each side of the pasting surface extending downwardly from the said slot.

2. In a device as set forth in claim 1, said pasting surface comprising rectangular sections removably secured together in abutting relationship, each section comprising a rectangular frame adapted to seat upon the base; and a laminated metal and plywood front facing on said frame in which the metal lamination is disposed outermost to form a working surface.

3. In a device as set forth in claim 1, said maintaining means comprising inner and outer spaced struts having their upper ends secured to the pasting surface, and having their lower ends secured to the base.

4. In a device as set forth in claim 3, said roll supporting means comprising open journals mounted on the outer struts and comprising straps having their lower ends rolled upwardly and boxed on their outer sides; and a rod passing through the roll of material and having its ends seated in said open journals.

5. In a device as set forth in claim 1, said journals for the pressure roller comprising brackets having vertical slots therein open at their upper ends for receiving journal shaft extensions of the pressure roll; and the axes of said slots being disposed on the vertical axis of the pasting surface.

6. An upright pasting device, comprising a base; a pasting surface extending upwardly and inwardly of the base adjacent one side thereof; means for maintaining said pasting surface in said inclined position; means for removably and rotatably supporting a roll of material to be pasted in the rear of the pasting surface and above said base whereby the web of said roll may be passed upwardly from the roll and over the top of the pasting surface and then down upon the front face of the pasting surface; a removable pressure roller gravitationally journaled at the top of the pasting surface and adapted to contact and to seat upon the upper edge of the pasting surface with the web of material interposed between the pressure roller and the pasting surface; said pasting surface having a horizontal web cutting slot therein adjacent and below the pressure roller; measuring indicia disposed on and at each side of the pasting surface extending downwardly from the said slot; and means for marking a continuous line on the web of material adjacent one side thereof as it leaves the roll and passes toward the said pressure roller.

7. In a device as set forth in claim 6, said pasting surface comprising rectangular sections removably secured together in abutting relationship, each section comprising a rectangular frame adapted to seat upon the base; and a laminated metal and plywood front facing on said frame in which the metal lamination is disposed outermost to form a working surface.

8. In a device as set forth in claim 6, said maintaining means comprising inner and outer spaced struts having their upper ends secured to the pasting surface, and having their lower ends secured to the base.

9. In a device as set forth in claim 8, said roll supporting means comprising open journals mounted on the outer struts and comprising straps having their lower ends rolled upwardly and boxed on their outer sides; and a rod passing through the roll of material and having its ends seated in said open journals.

10. In a device as set forth in claim 9, said marking means comprising a horizontal arm pivotally mounted on one strap, and having a socket at its free end overlying the roll of material; and a scriber adjustably mounted in said socket.

11. In a device as set forth in claim 6, said journals for the pressure roller comprising brackets having vertical slots therein open at their upper ends for receiving journal shaft extensions of the pressure roll; and the axes of said slots being disposed on the vertical axis of the pasting surface.

12. A collapsible upright pasting device, comprising a portable rectangular base; a pasting surface extending upwardly and inwardly of the base along one side thereof; means for maintaining said pasting surface in inclined position, said means extending upwardly and inwardly from the opposite side of the base; said pasting surface and said means being detachably connected to each other and to the base; means for removably and rotatably supporting a roll of material to be pasted on and between said maintaining means above said base whereby the web of said roll may be passed upwardly from the roll in rear of the pasting surface and over the top of the pasting surface and then down upon the front face of the pasting surface; a removable pressure roller gravitationally journaled in brackets disposed at the upper ends of the sides of the pasting surface and adapted to contact and to seat upon the upper edge of the pasting surface with the web of material interposed between the pressure roller and the pasting surface; said pasting surface having a horizontal web cutting slot therein adjacent and below the pressure roller; and measuring indicia disposed on and at each side of the pasting surface extending downwardly from the said slot.

13. In a device as set forth in claim 12, said pasting surface comprising rectangular sections removably secured together in abutting relationship, each section comprising a rectangular frame adapted to seat upon the base; and a laminated aluminum and plywood facing on said frame in which the aluminum lamination is disposed outermost to form a working surface; and each section having spaced tongues extending from the lower corners thereof removably engaging slots in the adjacent edge of the base.

14. In a device as set forth in claim 12, said maintaining means comprising inner and outer spaced struts having their upper ends removably secured to the pasting surface, and having their lower ends removably engaging slots in the adjacent edge of the base.

15. In a device as set forth in claim 14, said roll supporting means comprising open journals mounted on the outer struts and comprising straps having their lower ends rolled upwardly and boxed on their outer sides; and a rod passing through the roll of material and having its ends seated in said open journals.

16. In a device as set forth in claim 12, said brackets for the pressure roll having vertical slots therein open at their upper ends for receiving journal shaft extensions of the pressure roll; and the axes of said slots being disposed on the vertical axis of the pasting surface.

17. In combination with a device as set forth in claim 12, means for marking a continuous line on the web of material adjacent one side thereof as it leaves the roll and passes toward the said pressure roller.

18. In a device as set forth in claim 17, said roll supporting means comprising open journals mounted on the outermost struts and comprising straps having their lower ends rolled upwardly and boxed on their outer sides to receive a rod passing through the roll of material and having its ends seated in said open journals; and said marking means comprising a horizontal arm pivotally mounted on one strap, and having a socket at its free end overlying the roll of material; and a pencil adjustably mounted in said socket.

References Cited in the file of this patent

UNITED STATES PATENTS

| | | |
|---|---|---|
| 524,617 | Slaughter | Aug. 14, 1894 |
| 2,571,976 | Ward | Oct. 16, 1951 |
| 2,588,092 | Duff | Mar. 4, 1952 |
| 2,855,280 | McConnaughey | Oct. 7, 1958 |
| 3,100,573 | Cox | Aug. 13, 1963 |